US010830123B2

(12) United States Patent
Homison et al.

(10) Patent No.: US 10,830,123 B2
(45) Date of Patent: Nov. 10, 2020

(54) SYSTEMS AND METHOD FOR A WASTE HEAT-DRIVEN TURBOCHARGER SYSTEM

(71) Applicant: Transportation IP Holdings, LLC, Norwalk, CT (US)

(72) Inventors: Christopher Joseph Homison, Wattsburg, PA (US); Lukas Johnson, Erie, PA (US); Daniel Edward Loringer, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 16/220,389

(22) Filed: Dec. 14, 2018

(65) Prior Publication Data

US 2019/0195121 A1 Jun. 27, 2019

(30) Foreign Application Priority Data

Dec. 27, 2017 (IN) .............................. 201741046765

(51) Int. Cl.
*F02B 37/10* (2006.01)
*F02B 37/013* (2006.01)
(Continued)

(52) U.S. Cl.
CPC .............. *F02B 37/10* (2013.01); *F01K 23/10* (2013.01); *F02B 37/007* (2013.01);
(Continued)

(58) Field of Classification Search
CPC ...... F02B 37/10; F02B 37/007; F02B 37/013; F02C 6/12; F02C 9/28; F02C 9/16;
(Continued)

(56) References Cited

U.S. PATENT DOCUMENTS 5,553,448 A 9/1996 Farrell et al.
6,273,076 B1 * 8/2001 Beck .................... F02B 29/0412
123/562

(Continued)

FOREIGN PATENT DOCUMENTS

CN 102644499 A 8/2012
WO 2013159299 A1 10/2013
WO 2013167726 A2 11/2013

OTHER PUBLICATIONS

Homison, C. et al., "Systems and Methods for Increasing Power Output in a Waste Heat Driven Air Brayton Cycle Turbocharger System," U.S. Appl. No. 16/221,273, filed Dec. 14, 2018, 58 pages.
(Continued)

*Primary Examiner* — Hoang M Nguyen
(74) *Attorney, Agent, or Firm* — McCoy Russell LLP

(57) ABSTRACT

Systems and methods are provided for a waste heat-driven turbocharger system. In one example, a system for use with a power generator having a rotary machine including a combustor and an exhaust passage flowing exhaust gases from the combustor comprises: a heat exchanger positioned in the exhaust passage; and a turbocharger system, comprising: at least one low pressure turbocharger including a low pressure turbine coupled to an outlet of the heat exchanger and a low pressure compressor coupled to an inlet of the heat exchanger; at least one mid-pressure turbocharger including a mid-pressure turbine coupled to the outlet and a mid-pressure compressor coupled to the low pressure compressor; and at least one high pressure turbocharger including a high pressure turbine arranged in series or parallel with the mid-pressure turbine and a high pressure compressor arranged in series with the mid-pressure compressor and coupled to the combustor of the rotary machine.

20 Claims, 6 Drawing Sheets

(51) Int. Cl.
*F01K 23/10* (2006.01)
*F02C 6/18* (2006.01)
*F02B 37/007* (2006.01)
*F02C 6/12* (2006.01)
*F02C 7/10* (2006.01)
*F02C 7/143* (2006.01)
*F02C 9/16* (2006.01)
*F02C 9/28* (2006.01)

(52) U.S. Cl.
CPC .............. *F02B 37/013* (2013.01); *F02C 6/12* (2013.01); *F02C 6/18* (2013.01); *F02C 7/10* (2013.01); *F02C 7/143* (2013.01); *F02C 9/16* (2013.01); *F02C 9/28* (2013.01); *F05D 2220/40* (2013.01); *F05D 2220/62* (2013.01); *F05D 2260/20* (2013.01); *F05D 2260/42* (2013.01)

(58) Field of Classification Search
CPC .... F02C 7/143; F02C 7/10; F02C 6/18; F01K 23/10; F05D 2220/62; F05D 2260/42; F05D 2260/20; F05D 2220/40
USPC ....... 60/605.1–612, 39.183, 39.15, 791, 792, 60/39.19
See application file for complete search history.

(56) References Cited

U.S. PATENT DOCUMENTS

| | | | |
|---|---|---|---|
| 6,672,062 B2* | 1/2004 | Shaffer | F02B 29/0437 60/39.183 |
| 6,901,759 B2* | 6/2005 | Frutschi | F02C 1/08 60/39.183 |
| 2006/0248899 A1* | 11/2006 | Borchert | F02C 7/08 60/791 |
| 2008/0104958 A1* | 5/2008 | Finkenrath | B01D 53/00 60/605.2 |
| 2010/0024416 A1* | 2/2010 | Gladden | F02B 37/001 60/605.2 |

OTHER PUBLICATIONS

Homison, C. et al., "Systems and Methods for Increasing Power Output in a Waste Heat Driven Air Brayton Cycle Turbocharger System," U.S. Appl. No. 16/221,306, filed Dec. 14, 2018, 58 pages.
Homison, C. et al., "Turbocharger Systems and Method for Capturing a Process Gas," U.S. Appl. No. 16/276,177, filed Feb. 14, 2019, 37 pages.

\* cited by examiner

SYSTEMS AND METHOD FOR A WASTE HEAT-DRIVEN TURBOCHARGER SYSTEM

CROSS REFERENCE TO RELATED APPLICATIONS

The present application claims priority to Indian Patent Application No. 201741046765, entitled "TURBOCHARGER SYSTEM FOR A ROTARY MACHINE AND METHOD OF ASSEMBLING THE SAME", and filed on Dec. 27, 2017. The entire contents of the above-listed application are hereby incorporated by reference for all purposes.

BACKGROUND

Technical Field

Embodiments of the subject matter disclosed herein relate to turbocharger systems for use with a rotary machine.

Discussion of Art

Some rotary machines, such as some gas turbine engines, include a compressor, a combustor, and a turbine coupled in a serial flow relationship. More specifically, the compressor receives ambient air (e.g., via an intake) and discharges compressed air. The compressed air is then mixed with fuel and ignited in the combustor to produce a high energy gas stream. The high energy gas stream flows through the turbine to rotatably drive the turbine. The compressor and turbine are coupled through a shaft to form a rotor assembly, such that rotation of the turbine drives the compressor and a load coupled to the shaft.

A power output of such rotary machines is limited by a mass flow rate of working fluid (e.g., air) through the rotary machine. For example, a compressor intake mass flow of the rotary machine is decreased during high temperature ambient conditions due to a decrease in ambient air density, limiting the power output of the rotary machine in such ambient conditions. In addition, in at least some rotary machines, air is extracted from the compressor and used for purposes other than combustion. The extracted air is used, for example, to cool components of the turbine exposed to the high energy gas stream, which is hot. However, as a quantity of air extracted from the compressor for cooling or other purposes increases, an efficiency of the rotary machine decreases.

As another example, a temperature of the air through the rotary machine may limit the power output of the rotary machine due to the need to maintain a temperature at the inlet of the turbine within temperature thresholds that are dependent on the materials of the turbine. In such an example, injection of additional air from the turbocharger system that is at a lower temperature enables additional fueling of the combustor to increase the power output.

BRIEF DESCRIPTION

In one embodiment, a system for use with a power generator having a rotary machine including a combustor and an exhaust passage flowing exhaust gases from the combustor includes a heat exchanger positioned in the exhaust passage; and a turbocharger system, comprising: at least one low pressure turbocharger including a low pressure turbine fluidly coupled to an outlet of the heat exchanger and a low pressure compressor fluidly coupled to an inlet of the heat exchanger; at least one mid-pressure turbocharger including a mid-pressure turbine fluidly coupled to the outlet of the heat exchanger and a mid-pressure compressor fluidly coupled to the low pressure compressor; and at least one high pressure turbocharger including a high pressure turbine arranged in series or parallel with the mid-pressure turbine and a high pressure compressor arranged in series with the mid-pressure compressor and fluidly coupled to the combustor of the rotary machine.

DETAILED DESCRIPTION

Figure 1:
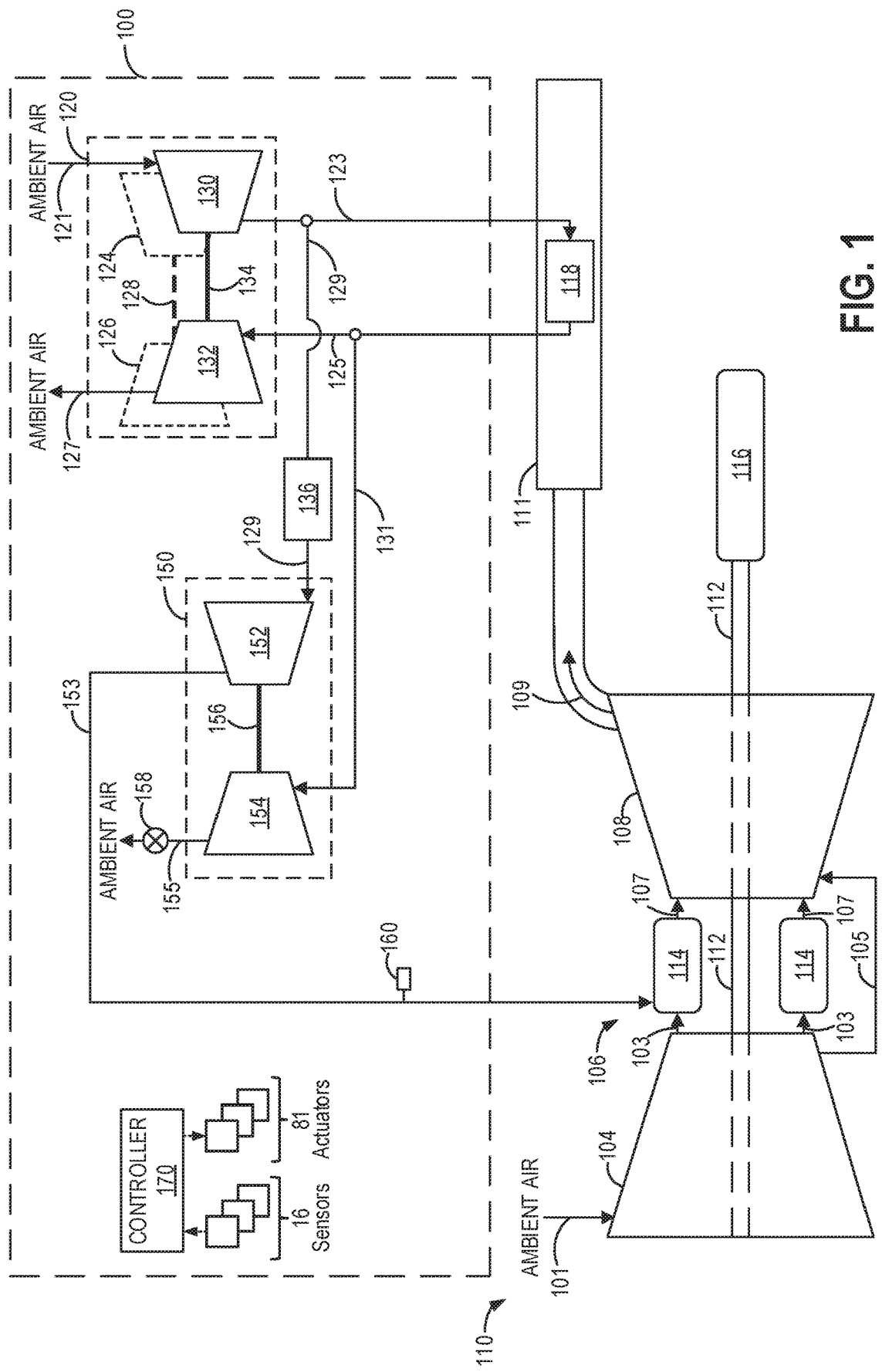
FIG. 1 shows a schematic representation of an exemplary rotary machine coupled to a first exemplary turbocharger system, according to an embodiment of the invention.

The following description relates to embodiments of a system for use with a power generator having a rotary machine including a combustor and an exhaust passage flowing exhaust gases from the combustor, including: a heat exchanger positioned in the exhaust passage; and a turbocharger system, comprising: at least one low pressure turbocharger including a low pressure turbine fluidly coupled to an outlet of the heat exchanger and a low pressure compressor fluidly coupled to an inlet of the heat exchanger; at least one mid-pressure turbocharger including a mid-pressure turbine fluidly coupled to the outlet of the heat exchanger and a mid-pressure compressor fluidly coupled to the low pressure compressor; and at least one high pressure turbocharger including a high pressure turbine arranged in series or parallel with the mid-pressure turbine and a high pressure compressor arranged in series with the mid-pressure compressor and fluidly coupled to the combustor of the rotary machine. In one example, the high pressure turbine may be arranged in series with the mid-pressure turbine, and the high pressure turbine receives air flow directly from an outlet of the mid-pressure turbine. As another example, the high pressure turbine may be arranged in parallel with the mid-pressure turbine, and each of the high pressure turbine and the mid-pressure turbine receive heated, compressed air flow from the outlet of the heat exchanger. As such, the turbocharger system may comprise a waste heat-driven air Brayton cycle turbocharger system configured to inject air into the combustor of the rotary machine.

For example, exhaust gases from the turbine of the rotary machine, generated at the combustor, flow to the heat exchanger, where waste heat from the exhaust gases is transferred to compressed air received at the heat exchanger from the low pressure compressor. The heated compressed air is discharged from the heat exchanger and flows to the low pressure turbine, the mid-pressure turbine, and the high pressure turbine. The heated compressed air imparts a rotational force on each turbine, which drives the corresponding compressor to generate compressed air. The low pressure compressor, the mid-pressure compressor, and the high pressure compressor may be coupled in series with intercooling in between each compressor such that ambient air received by the low pressure compressor is compressed three times before being discharged from the high pressure compressor. The compressed air discharged from the high pressure compressor may be injected at the rotary machine as auxiliary compressed air, such as to increase a power output of the rotary machine.

In further examples, the turbocharger system may include a turbine backpressure valve arranged in a gas flow path downstream of an outlet of the high pressure turbine. In some cases, shifting operating conditions to the turbocharger system cause the high pressure compressor to be driven into choke conditions at low loads of the rotary machine. However, the embodiments described herein enable the high pressure compressor to avoid choke conditions across a wide range of ambient and rotary machine operating conditions. For example, a controller of the turbocharger system may actively adjust a position of the turbine backpressure valve based on operating conditions, including the load of the rotary machine. For example, the valve may be further closed during low load conditions to increase a backpressure upstream of the high pressure turbine, thereby decreasing a speed of the high pressure turbine and a mass flow of the high pressure compressor.

Further, embodiments of the turbocharger system may include two compression stages (e.g., the low pressure turbocharger and the high pressure turbocharger) or three compression stages (e.g., the low pressure turbocharger, the mid-pressure turbocharger, and the high pressure turbocharger). Including the mid-pressure turbocharger enables a high pressure compression process to be divided between the mid-pressure compressor and the high pressure compressor, coupled in series with and downstream of the mid-pressure compressor. As a result, a size of the high pressure turbocharger may be reduced. Further, an overall thermodynamic efficiency of the compression process may be increased by including intercoolers for reducing a temperature of the compressed gas after each compression stage, as a higher pressure of compressed gas may be achieved for a same amount of input energy.

Figure 2:
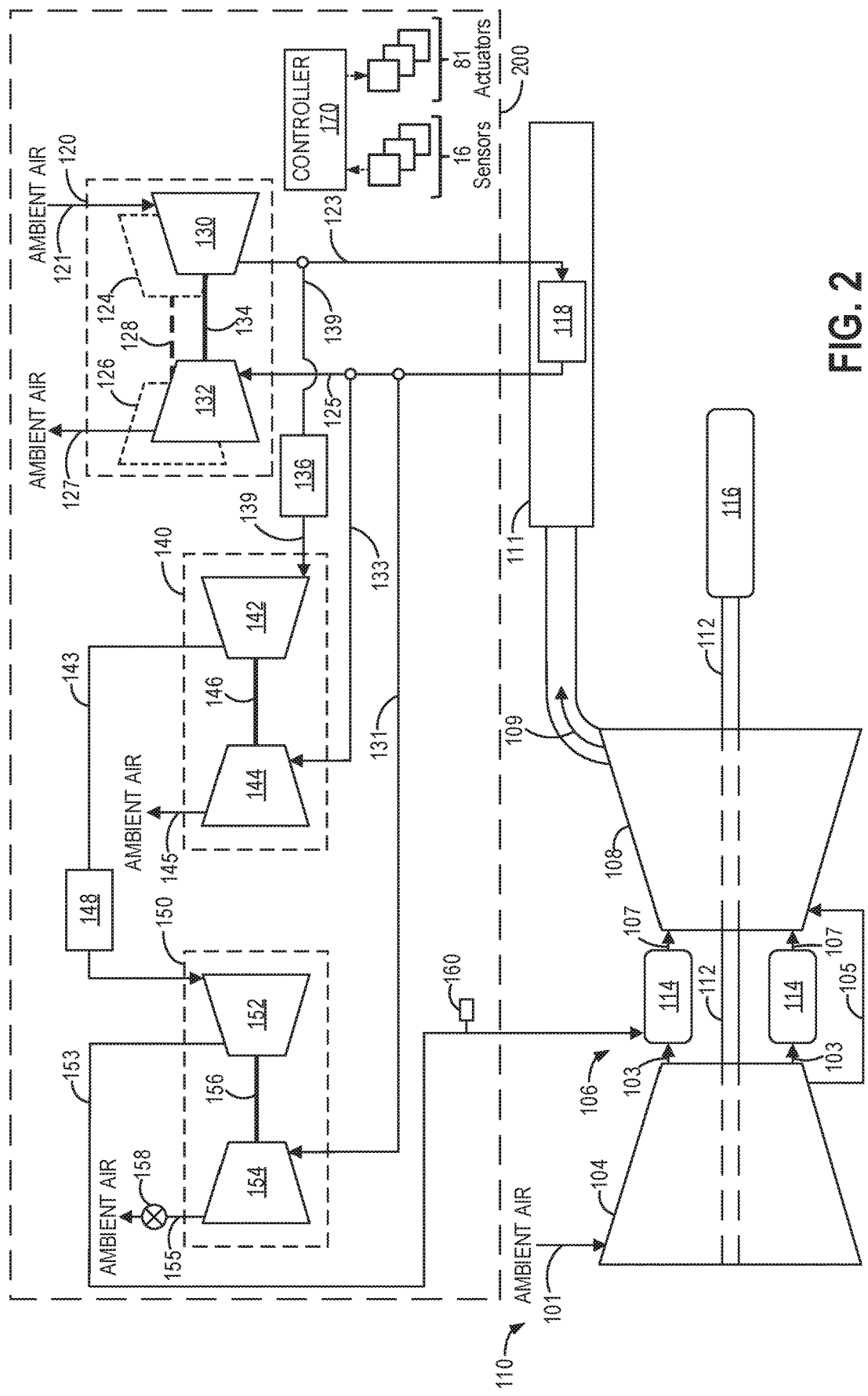
FIG. 2 shows a schematic representation of an exemplary rotary machine coupled to a second exemplary turbocharger system, according to an embodiment of the invention.
Figure 3:
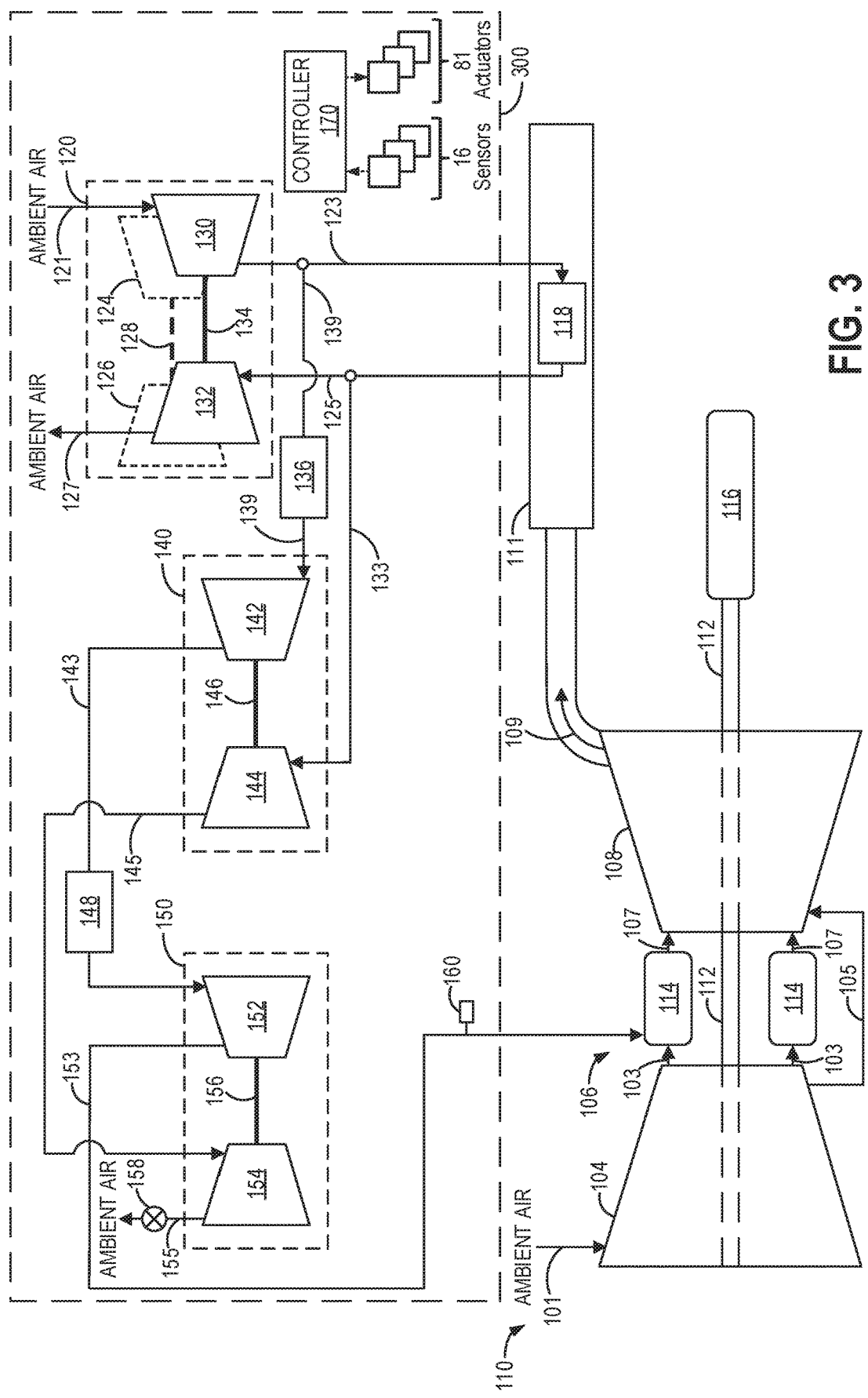
FIG. 3 shows a schematic representation of an exemplary rotary machine coupled to a third exemplary turbocharger system, according to an embodiment of the invention.
Figure 5:
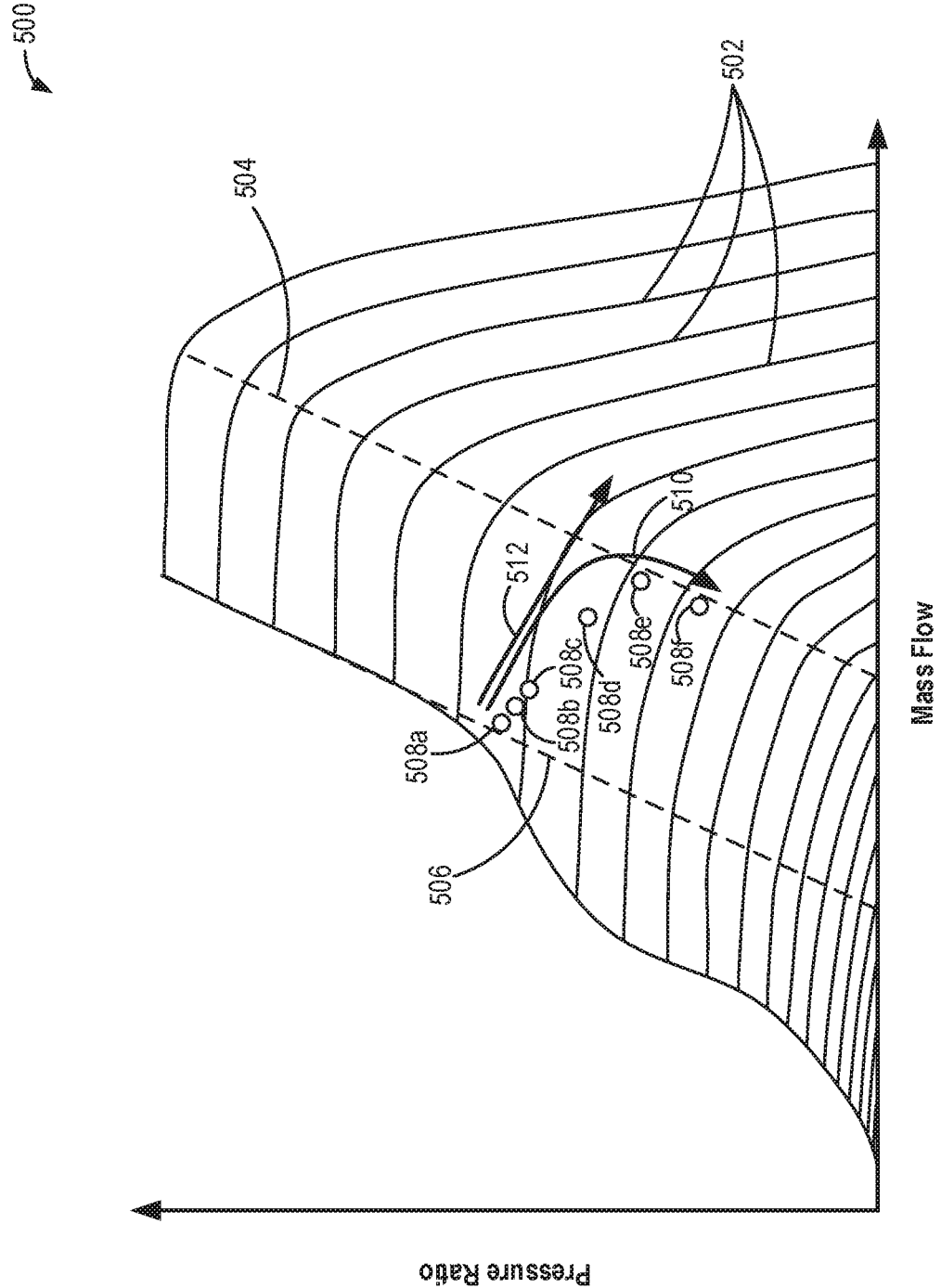
FIG. 5 shows an example compressor map of a high pressure turbocharger compressor included in a turbocharger system coupled to a rotary machine.
Figure 6:
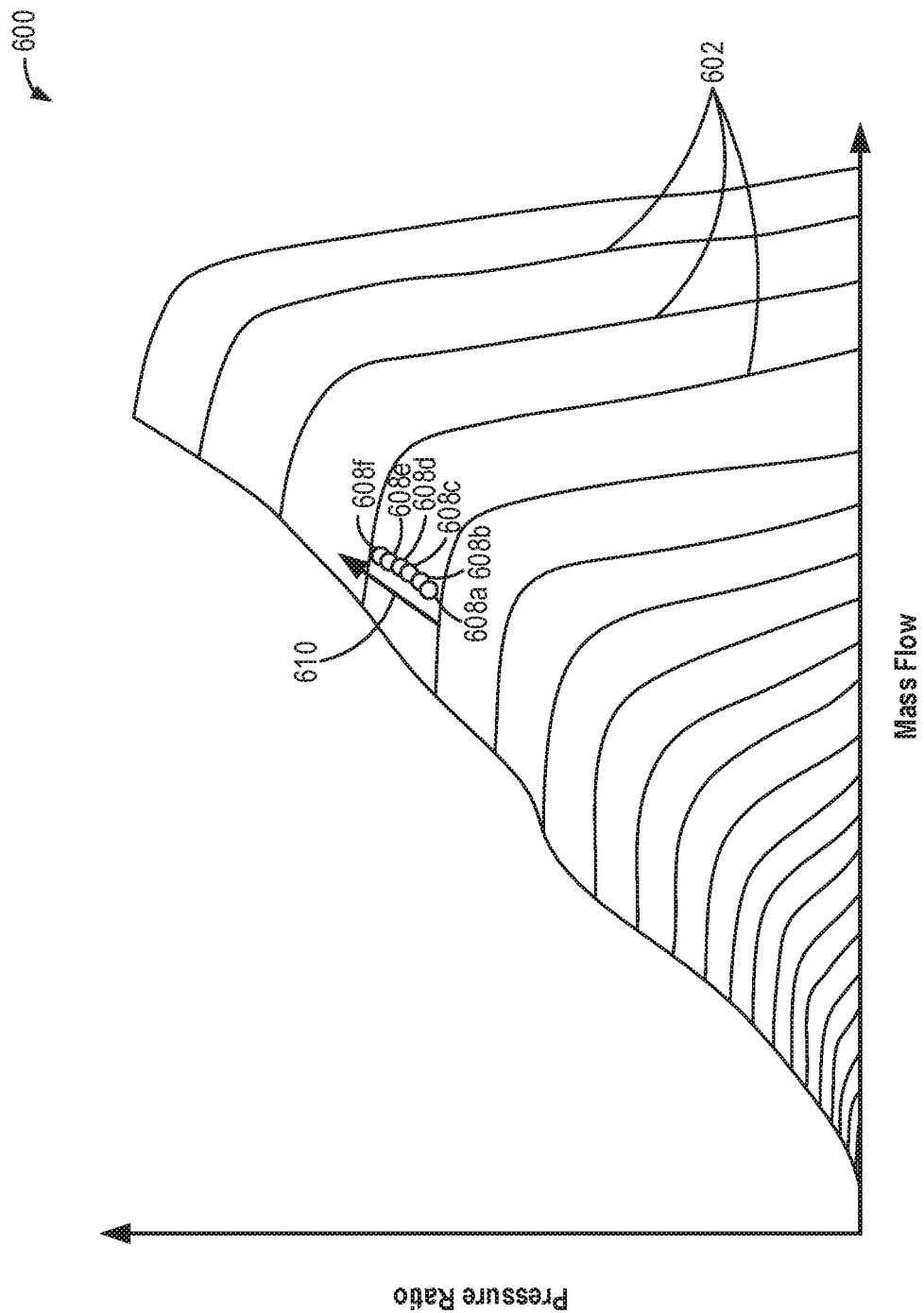
FIG. 6 shows an example compressor map of a low pressure turbocharger compressor included in a turbocharger system coupled to a rotary machine.

FIG. 1 shows a first exemplary embodiment of a waste heat-driven air Brayton cycle turbocharger system coupled to a rotary machine, the first exemplary embodiment including two compression stages (a low pressure stage and a high pressure stage). FIGS. 2 and 3 show a second and third exemplary embodiment, respectively, of a waste heat-driven air Brayton cycle turbocharger system coupled to a rotary machine, the second and third exemplary embodiments including three compression stages (the low pressure stage, the high pressure stage, and a mid-pressure stage coupled between the low pressure stage and the high pressure stage). The first, second, and third exemplary embodiments may each include a turbine backpressure valve coupled downstream of the high pressure stage turbocharger turbine. A controller may be configured to adjust the turbine backpressure valve to provide a desired pressure downstream of the high pressure stage turbine based on operating conditions, such as according to the method of FIG. 4. For example, adjusting the turbine backpressure valve may adjust a work load distribution between the low pressure stage and the high pressure stage. In particular, adjusting the work load distribution between the low pressure stage and the high pressure stage leads to an increase in the pressure of the gas exiting a compressor of the low pressure stage, which further reduces the corrected mass flow through a compressor of the high pressure stage due to a high density of the gas. Example compressor maps for the compressor of the high pressure stage and the compressor of the low pressure stage are shown in FIGS. 5 and 6, respectively.

Turbocharger compressor operating conditions will be referred to throughout the following detailed description. A surge limit delineates a lower limit air flow for compressor operation while a choke limit defines a highest possible mass flow rate at a given pressure ratio. For example, compressor surge may occur during low compressor flow conditions, such as rapid unloading events, driven by a decrease in rotor speed at such a rate that backpressure on the compressor is not decreasing fast enough for the compressor to continue to sustain that pressure. This leads to a high pressure zone at the outlet of the compressor, driving a reversal in the air flow direction that may cause degradation of the turbocharger. Operation beyond the choke limit may result in the rotational speed of the turbine driving the compressor being higher than a maximum design speed of the turbocharger. Choke may occur during transient overspeed events where, for example, an increase in load subjects the turbocharger to flow beyond a tolerance of the turbocharger. Repeated instances of turbocharger choke may also cause degradation of the turbocharger and/or limit an output of the turbocharger.

Referring to FIG. 1, a schematic depiction of a first exemplary turbocharger system 100 coupled to an exemplary rotary machine 110 is shown. In the depicted embodiment, the rotary machine is a boosted gas turbine engine, receiving boost air from the first turbocharger system, as will be further described below. In other embodiments, the rotary machine may be any other turbine engine and/or rotary machine, including, but not limited to, a gas turbofan aircraft engine or other aircraft engine. The rotary machine includes a compressor section 104, a combustor section 106 coupled downstream from compressor section, a turbine section 108 coupled downstream from the combustor section, and an exhaust section 111 coupled downstream from the turbine section. The turbine section is coupled to the compressor section via a rotor (e.g., shaft) 112. The rotor is further coupled to a load 116, which may be an electrical generator and/or a mechanical drive application, for example. Note that, as used herein, the term "couple" is not limited to a direct mechanical, electrical, and/or communication connection between components, but may also include an indirect mechanical, electrical, and/or communication connection between multiple components.

During operation, ambient (intake) air 101 is received by the compressor section. The compressor section compresses the received intake air and discharges compressed air 103, also referred to as compressor discharge casing (CDC) air herein. The CDC air is channeled into the combustor section. In the illustrated embodiment, the combustor section includes a plurality of combustors 114, and the combustor section is coupled to the compressor section such that each of the combustors receives the CDC air from the compressor section. In the combustors, the CDC air is mixed with fuel and ignited to generate high temperature combustion gases 107. The combustion gases are channeled into the turbine section and impart a rotational force on the rotor, which drives the compressor section and the load 116. The combustion gases are exhausted from the turbine section as exhaust gases 109, which are channeled into the exhaust section. The exhaust gases retain residual heat, such that the exhaust gases are at an exhaust temperature above a temperature of the ambient air.

In some embodiments, a compressor extraction flow 105 is additionally extracted from the compressor section and diverted away from the combustor section. For example, in the illustrated embodiment, the compressor extraction flow is channeled directly (that is, not through the combustors) to the turbine section and used to cool components of the turbine section exposed to the hot combustion gases. In other embodiments, the compressor extraction flow is channeled to any other suitable use or combination of uses apart from combustion in the combustors. However, removal of the compressor extraction flow from the working fluid path through the rotary machine reduces an efficiency of the rotary machine. That is, as a quantity of the compressor extraction flow increases relative to the CDC air, the efficiency of the rotary machine correspondingly decreases.

Therefore, the first turbocharger system 100 is configured to provide auxiliary compressed air 153 (also referred to as "CDC boost air" or simply "boost air") to the rotary machine to reduce or prevent the decrease in the efficiency of the rotary machine. Specifically, the auxiliary compressed air is input into the combustors 114, supplementing the CDC air from the compressor section. For example, the auxiliary compressed air may at least partially replace or even exceed the quantity of the compressor extraction flow diverted from the combustor section. More specifically, the combustor section is configured to channel the auxiliary compressed air into a flow path of the combustion gases such that a mass flow rate and/or temperature of combustion gases through the rotary machine is increased. Thus, the auxiliary compressed air provided by the first turbocharger system facilitates an increased power output of the rotary machine for a given set of ambient conditions.

As one example, during high temperature ambient conditions, a mass flow of the ambient intake air into the compressor section of the rotary machine is relatively decreased due to a decrease in ambient air density, which correspondingly reduces the mass flow of the combustion gases and limits the power output of the rotary machine. Further, the high temperature itself may limit the power output of the rotary machine due to a need to maintain a temperature at an inlet to the turbine section within temperature thresholds that are dependent on the materials of the turbine. However, the high temperature ambient conditions also result in a relatively larger amount of residual heat in the exhaust gases that may not be efficiently used in, for example, a heat recovery steam generator (not shown). The auxiliary compressed air provided by the first turbocharger system, driven by the residual heat in exhaust gases, and/or a corresponding increase in a fuel flow rate of the combustor section enabled by the addition of the auxiliary compressed air (e.g., due to a lower temperature of the auxiliary compressed air), enables the power output of the rotary machine to be increased.

As another example, during operation of the rotary machine at output demands that are lower than a baseload of the rotary machine, a flow rate of the intake air may be selectively reduced, such as by closing inlet guide vanes (not shown) of the rotary machine, and the auxiliary compressed air is added to the flow path of the combustion gases, resulting in decreased fuel flow in the combustor section and a more efficient operation of rotary machine.

In the embodiment shown in FIG. 1, the first turbocharger system 100 includes a low pressure turbocharger (LPT) stage 120 and a high pressure turbocharger (HPT) stage 150 coupled downstream from the LPT stage. The LPT stage includes one or more low pressure turbochargers, including a LPT compressor 130 rotationally coupled to a LPT turbine 132 via a LPT rotor 134. In some embodiments, the LPT stage may include a bank of low pressure turbochargers. For example, FIG. 1 optionally shows a second LPT compressor 124 coupled to a second LPT turbine 126 via a second LPT rotor 128. In embodiments where the LPT stage includes multiple low pressure turbochargers, the low pressure turbochargers may be smaller in size than when a single low pressure turbocharger is included. The multiple low pressure turbochargers may be coupled in parallel with one another. The HPT stage includes one or more high pressure turbochargers, including a HPT compressor 152 rotationally coupled to a HPT turbine 154 via a HPT rotor 156.

In the exemplary embodiment, the LPT rotor and the HPT rotor are each not coupled to the rotor of the rotary machine. Thus, each of the one or more low pressure turbochargers and the one or more high pressure turbochargers is operable at a speed independent of a speed of the rotor of the rotary machine. In some such embodiments, the one or more low pressure turbochargers and the one or more high pressure turbocharger are operated at relatively high speeds compared to the rotor of the rotary machine, such that a size of the one or more low pressure turbochargers and the one or more high pressure turbochargers for producing a selected amount of compressed air is correspondingly reduced.

Moreover, in the exemplary embodiment, the LPT rotor and the HPT rotor are not coupled to each other, such that the one or more low pressure turbochargers and the one or more high pressure turbochargers are operable at speeds independent of each other. In some such embodiments, operating the one or more low pressure turbochargers and the one or more high pressure turbochargers at independent speeds helps maintain a selected work load distribution between the LPT stage and the HPT stage, for example, to meet a desired pressure and flow rate for injection of the auxiliary compressed air into the rotary machine across varying ambient conditions and/or operating points of the rotary machine.

During operation, ambient air 121 enters the LPT compressor, where it is compressed. The LPT compressor discharges LPT compressed air, which is divided into a heat exchanger flow 123 and a HPT compressor flow 129. In embodiments that include a bank of low pressure turbochargers coupled in parallel, the LPT compressed air from each low pressure turbocharger may be collected in a manifold that combines all of the LPT compressed air into a single stream before it is divided into the heat exchanger flow and the HPT compressor flow. A heat exchanger 118 receives the heat exchanger flow and places the LPT compressed air of the heat exchanger flow into thermal communication with the exhaust gases of the rotary machine, such that at least a portion of the residual heat of the exhaust gases is transferred to the heat exchanger flow. In this way, via the heat exchanger, the hotter exhaust gases of the rotary machine transfer heat to the cooler compressed air from the one or more LPT compressors.

In the depicted embodiment, the heat exchanger is positioned within the exhaust section of the rotary machine. In some embodiments, the rotary machine is part of a simple cycle gas turbine power plant, in which the exhaust section is coupled to an exhaust stack (not shown), and the heat exchanger is coupled upstream of the exhaust stack. In other embodiments, the rotary machine is part of a combined cycle gas turbine power plant, in which the exhaust section is coupled to a heat recovery steam generator (HRSG) configured to supply steam to at least one steam turbine (not shown). Additionally or alternatively, steam may be used for other processes, such as supplied to an adjacent plant (oil refinery, concrete plant, etc.), for heating, etc. For example, the combined cycle power plant may be configured to selectively channel the exhaust gases to either the HRSG or a bypass stack (not shown) depending on operating conditions, and the heat exchanger may be coupled upstream of the bypass stack such that the first turbocharger system is activatable when the combined cycle gas turbine power plant is operated in a simple cycle mode using the bypass stack. In another example, the heat exchanger may be coupled upstream of the HRSG in a series configuration. In such an example, discharge from turbines of the turbocharger system may be directed back to the exhaust section of the rotary machine, upstream of the HRSG and downstream of the heat exchanger. Thus, the rotary machine and the first turbocharger system may be included in a power generation system. In still other embodiments, the rotary machine is used in any suitable application and/or the heat exchanger is positioned at any suitable location that enables the first turbocharger system to function as described herein.

The heat exchanger flow, heated and discharged from the heat exchanger, is divided by the first turbocharger system into an LPT turbine inlet flow 125 and an HPT turbine inlet flow 131, which drive the LPT turbine and the HPT turbine, respectively. Thus, the LPT turbine inlet flow and the HPT turbine inlet flow are parallel streams from the heat exchanger flow. The LPT turbine receives the LPT turbine inlet flow, and the LPT turbine inlet flow imparts a rotational force on the LPT rotor to drive the LPT compressor. The LPT turbine exhausts the LPT turbine inlet flow to ambient air as LPT exhaust 127.

As such, the first turbocharger system provides a two-stage waste heat-driven air Brayton cycle injection system.

In the exemplary embodiment shown in FIG. 1, the HPT compressor inlet flow passes through an intercooler 136 positioned in flow communication between an outlet of the second LPT compressor and an inlet of the HPT compressor. The intercooler is suitably configured to decrease a temperature of the received HPT compressor inlet flow. As one non-limiting example, the intercooler places the HPT compressor inlet flow into thermal communication with a suitable flow of fluid (not shown) that is at a lower temperature than the HPT compressor inlet flow received by the intercooler. In this way, the intercooler is configured to remove at least a portion of the heat imparted to the HPT compressor inlet flow by the LPT compressor, thereby increasing a density of the HPT compressor inlet flow discharged from the intercooler and received by the HPT compressor. In alternative embodiments, the first turbocharger system does not include the intercooler. The HPT compressor receives the HPT compressor inlet flow, further compresses the HPT compressor inlet flow, and discharges the compressed HPT compressor inlet flow as the auxiliary compressed air 153.

The HPT turbine 154 receives the HPT turbine inlet flow, and the HPT turbine inlet flow imparts a rotational force on the HPT rotor, which drives HPT compressor. Thus, after start-up of the first turbocharger system is completed, no energy is tapped from the rotary machine upstream in the working fluid path (not shown) or from external sources (not shown) to power the HPT stage. The HPT turbine is configured to be driven solely by the HPT turbine inlet flow during a post-start-up operation of the first turbocharger system.

The HPT turbine exhausts the HPT turbine inlet flow as HPT exhaust 155. A turbine backpressure valve 158 positioned in flow communication downstream of an outlet of the HPT turbine to regulate a flow rate of the HPT exhaust, and thus, an amount of backpressure upstream of the valve and downstream of the HPT turbine. For example, the turbine backpressure valve may be configured to regulate a work load distribution between the LPT stage and the HPT stage, thereby controlling a compression ratio of the first turbocharger system, defined as a ratio of a pressure of the auxiliary compressed air to a pressure of the ambient air. More specifically, the work load distribution between the LPT stage and the HPT stage may be adjusted based on ambient conditions and/or a current operating point of the rotary machine, both of which affect a mass flow rate and/or a temperature of the exhaust gases from the rotary machine, and thus an amount of residual heat available to the heat exchanger. For example, as will be further described below with respect to FIGS. 4 and 5, without active control (e.g., by adjusting the turbine backpressure valve), lower load operating points may push the HPT compressor into choke conditions due to a low discharge pressure and a high mass flow rate. The turbine backpressure valve 158 may be an electronically controlled valve, adjusted into different positions (e.g., opened and closed) via electronic signals received from a controller, as described below.

A controller 170 is operatively coupled to at least one sensor 16, examples of which are described herein, and at least one actuator 81, examples of which are also described herein. For example, the at least one sensor may include various temperature, pressure, mass flow, and speed sensors coupled throughout the turbocharger system that provide electronic feedback signals to the controller, such as a pressure and/or mass flow sensor 160 configured to measure a pressure and/or mass flow of the auxiliary compressed air, and the at least one actuator may include the turbine backpressure valve. The controller may receive input data from the various sensors, process the input data, and trigger the actuators (e.g., the turbine backpressure valve) in response to the processed input data based on instruction or code programmed in a memory of the controller corresponding to one or more routines, an example of which is described with respect to FIG. 4.

As one example, the controller is programmed to adjust a position of the turbine backpressure valve to regulate the work load distribution between the LPT stage and the HPT stage and, correspondingly, the compression ratio produced by the turbocharger system, across varying ambient conditions and/or operating points of the rotary machine. Additionally or alternatively, the controller is programmed to regulate the turbine backpressure valve to regulate the work load distribution between the LPT stage and the HPT stage to meet a desired pressure and a selected flow rate for injection of the auxiliary compressed air into the rotary machine across varying ambient conditions and/or operating points of the rotary machine. For example, in some embodiments, the adjustment of the turbine backpressure valve affects the upstream division of the heated heat exchanger flow into the LPT turbine inlet flow and the HPT turbine inlet flow. For example, the turbine backpressure valve may be a continuously variable valve actuatable to a plurality of positions between fully open and fully closed. The controller may adjust the turbine backpressure valve to a position with a degree of opening for a desired work load distribution for the given ambient conditions and/or operating point of the rotary machine.

The controller may be comprised of one or more electronic computing devices, including at least one processing device (e.g., a central processing unit, graphics processing unit, microcontroller, and/or any other circuit or processing device capable of executing the functions described herein) and at least one memory chip, including an electronic storage medium for executable programs and calibration values (e.g., non-transitory read-only memory), random access memory, and keep alive memory. Communication between the controller and the at least one sensors and between the controller and the at least one actuator may be obtained through any suitable connection, such as via hardwired or a wireless arrangement. Although the controller is illustrated as a discrete system, the controller may be implemented at least partially by at least one processor embedded within any component of the rotary machine. The above examples are exemplary only, and thus are not intended to limit in any way the definition and/or meaning of the terms controller and processing device.

Next, FIG. 2 shows a schematic depiction of a second exemplary turbocharger system 200 coupled to the rotary machine 110 introduced in FIG. 1. Except as described below, the second turbocharger system is substantially the same as the first turbocharger system 100 of FIG. 1, and as such, like components are numbered the same and may not be reintroduced.

The second turbocharger system additionally includes a mid-pressure turbocharger (MPT) stage 140 coupled downstream from the LPT stage 120 and upstream of the HPT stage 150. The MPT stage includes a single high pressure turbocharger, including a MPT compressor 142 rotationally coupled to a MPT turbine 144 via a MPT rotor 146. During operation, the discharged LPT compressed air is divided into the heat exchanger flow 123 and a MPT compressor flow 139 (instead of the HPT compressor flow 129 shown in FIG. 1), which passes through the intercooler 136, which is a first intercooler positioned in flow communication between the outlet of the second LPT compressor and an inlet of the MPT compressor in the example configuration of FIG. 2. The MPT compressor receives the cooled MPT compressor inlet flow, further compresses the MPT compressor inlet flow, and discharges the further compressed air as an HPT compressor inlet flow 143.

The HPT compressor inlet flow passes through a second intercooler 148 positioned in flow communication between an outlet of the MPT compressor and an inlet of the HPT compressor. The second intercooler functions similarly to the first intercooler, as described above with respect to FIG. 1. In this way, the second intercooler is configured to remove at least a portion of the heat imparted to the HPT compressor inlet flow by the MPT compressor, thereby increasing a density of the HPT compressor inlet flow discharged from the intercooler and received by the HPT compressor. In particular, by intercooling in between each compressor, an inlet temperature of each compressor is reduced, thereby decreasing an amount of power required to compress the air to a desired pressure. Further, by including an intercooler between each compressor, a heat load for each intercooler may be reduced. As a result, a size of the first intercooler may be decreased. Additionally, cooling the HPT compressor inlet flow via the intercooler reduces a discharge temperature of the HPT compressor, allowing for less costly compressor wheel materials to be used (e.g., aluminum).

The HPT compressor receives the HPT compressor inlet flow, further compresses the HPT compressor inlet flow, and discharges the compressed HPT compressor inlet flow as the auxiliary compressed air 153. In particular, by dividing the compression of the auxiliary compressed air over three stages (e.g., the LPT stage, the MPT stage, and the HPT stage) instead of two stages (e.g., the LPT stage and the MPT stage as shown in FIG. 1), a higher flow rate of the auxiliary compressed air may be achieved for a same sizing of the turbocharger system. Further, a size of the HPT may be reduced. Further still, by dividing the compression process among three stages, a pressure ratio of each stage for a given auxiliary compressed air pressure is reduced, allowing for different compressor hardware that has a wider operating flow range (between surge and choke) to be applied. As a result, the turbocharger system is operable over a wider range of injection flows.

The MPT turbine receives a MPT turbine inlet flow 133 from the discharged heat exchanger flow, and the MPT turbine inlet flow imparts a rotational force on the MPT rotor, which drives the MPT compressor. The MPT turbine exhausts the MPT turbine inlet flow to atmosphere as MPT exhaust 145. In the embodiment depicted in FIG. 2, the MPT turbine and the HPT turbine are coupled in parallel such that the MPT turbine inlet flow and the HPT turbine inlet flow 131 are both received from the discharged heat exchanger flow. As shown in FIG. 2, the HPT turbine inlet flow may be diverted from the discharged heat exchanger flow upstream of the MPT turbine inlet flow. In this way, the HPT turbine and the MPT turbine both receive air heated at the heat exchanger 118 by the waste heat of the exhaust gases 109 of the rotary machine.

However, in other embodiments, such as the third exemplary turbocharger system 300 schematically depicted in FIG. 3, the MPT turbine and the HPT turbine are coupled in series. Except as described below, the third turbocharger system is substantially the same as the second turbocharger system 200 of FIG. 2, and as such, like components are numbered the same and may not be reintroduced. For example, the third turbocharger system provides a second embodiment of a three-stage waste heat-driven air Brayton cycle injection system.

In particular, in the third turbocharger system shown in FIG. 3, instead of the MPT turbine discharging the MPT exhaust 145 to atmosphere, the MPT exhaust is routed to the HPT turbine 154 to serve as the HPT inlet flow, and the HPT turbine does not receive an inlet flow from the discharged heat exchanger flow (e.g., the HPT inlet flow 131 shown in FIGS. 1 and 2). The MPT turbine receives the MPT turbine inlet flow 133 from the discharged heat exchanger flow and discharges the MPT exhaust, which flows to the HPT turbine to impart a rotational force on the HPT rotor and drive the HPT compressor. The MPT exhaust may have a reduced temperature and pressure compared with the MPT turbine inlet flow (and the HPT inlet flow 131 shown in FIGS. 1 and 2) due to the conversion of heat to work in the MPT turbine. The series configuration of the third turbocharger system shown in FIG. 3 may be more efficient than the parallel second turbocharger system shown in FIG. 2, in some embodiments, due to two expansion processes of the gas (e.g., through the MPT turbine and then through the HPT turbine). However, a size of the HPT turbine may be increased in the series configuration shown in FIG. 3 in order to operate on the lower pressure and temperature MPT exhaust.

Thus, the second turbocharger system of FIG. 2 and the third turbocharger system of FIG. 3 each provide a three-stage waste heat-driven air Brayton cycle injection system. In particular, the three-stage systems increase a thermodynamic efficiency of the compression process compared with the two-stage system shown in FIG. 1 by reducing a temperature of the compressed gas in between each compression stage, thereby allowing higher pressure or flow rate of auxiliary compressed air 153 to be achieved for a same amount of heat energy supplied by the exhaust gases 109 of the rotary machine 110.

Figure 4:
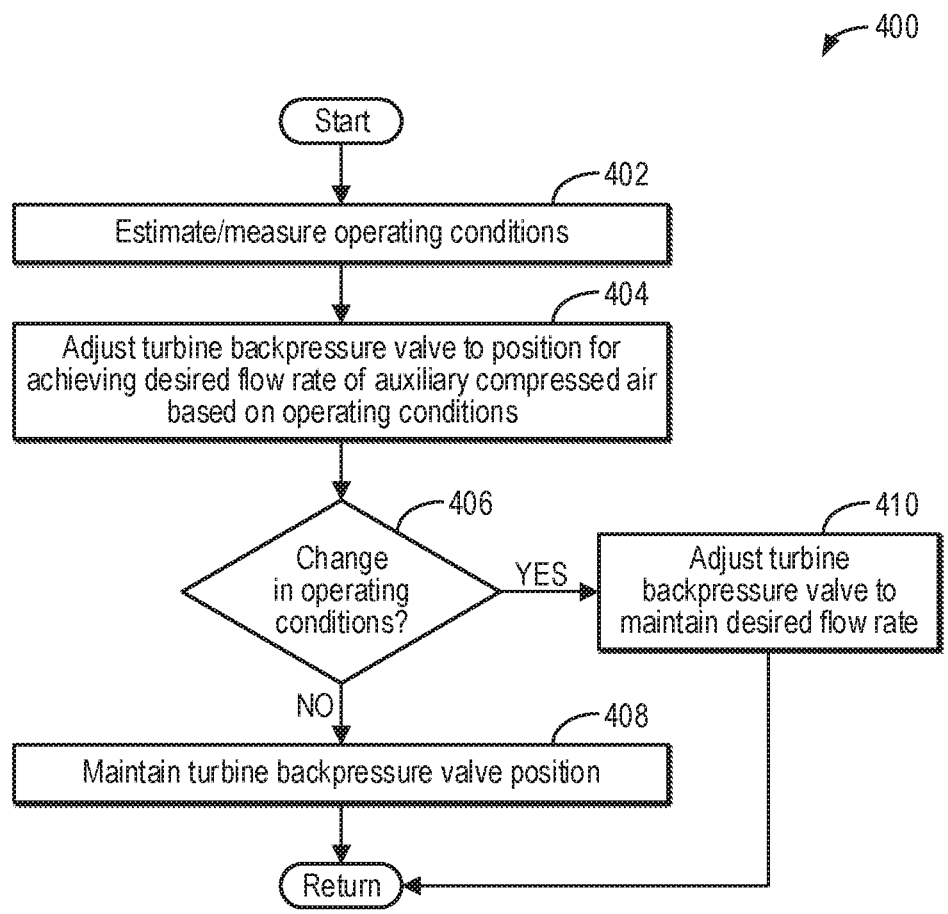
FIG. 4 is a flow chart showing a method for adjusting a turbine backpressure valve coupled downstream of a high pressure turbocharger turbine included in a turbocharger system coupled to a rotary machine, according to an embodiment of the invention.

Next, FIG. 4 shows an example method 400 for adjusting a turbine backpressure valve of a waste heat-driven air Brayton cycle injection system. For example, the waste heat-driven air Brayton cycle injection system may be the first turbocharger system 100 shown in FIG. 1, the second turbocharger system 200 shown in FIG. 2, or the third turbocharger system 300 shown in FIG. 3. Each of the first, second, and third turbocharger systems are configured to inject auxiliary compressed air into a combustor of a rotary machine (e.g., rotary machine 110 of FIGS. 1-3) and are driven by residual heat from exhaust gases of the rotary machine. In each example, the turbine backpressure valve (e.g., turbine backpressure valve 158 of FIGS. 1-3) is coupled downstream of the outlet of a HPT turbine (e.g., HPT turbine 154 of FIGS. 1-3) and is operable to adjust the mass flow through the HPT turbine, such as to achieve a desired pressure of the auxiliary compressed air. Instructions for carrying out method 400 may be executed by a controller (e.g., controller 170 of FIGS. 1-3) based on instructions stored on a memory of the controller and in conjunction with signals received from sensors of the turbocharger system, such as the sensors described above with reference to FIGS. 1-3 (e.g., sensors 16 and pressure and/or mass flow sensor 160 of FIGS. 1-3). The controller may employ actuators of the turbocharger system (e.g., turbine backpressure valve 158 of FIGS. 1-3) to adjust turbocharger system operation according to the methods described below.

At 402, method 400 includes estimating and/or measuring operating conditions. The operating conditions may include ambient conditions, such as ambient temperature and ambient pressure; operating conditions of the rotary machine, such as a mass flow rate (or load) of the rotary machine, a desired flow rate of auxiliary compressed air to inject at the rotary machine, and a temperature of exhaust gases discharged by the rotary machine; and operating conditions of the turbocharger system, such as a pressure and/or flow rate of the auxiliary compressed air provided by the turbocharger system, a pressure ratio across a HPT compressor of a high pressure turbocharger, a mass flow through the HPT compressor, a rotor speed of the high pressure turbocharger, a pressure ratio across a LPT compressor of a low pressure turbocharger, a mass flow through the LPT compressor, a rotor speed of the low pressure turbocharger, a pressure ratio across a MPT compressor of a mid-pressure turbocharger (if included), a mass flow through the MPT compressor, and a rotor speed of the mid-pressure turbocharger.

The desired flow rate of the auxiliary compressed air to inject at the rotary machine may be determined be based on an operating limit of a compressor of the rotary machine (e.g., a maximum allowable injection rate), a desired increase in output and/or reduction in a fuel rate (e.g., efficiency increase) of the rotary machine, and a maximum flow rate the turbocharger system can deliver. The maximum flow rate the turbocharger system can delivery may be defined by thermodynamic limits of the system, a flow capacity of the compressors (e.g., bounded by choke and surge lines), and/or a pressure capability of the compressors (e.g., due to a speed limit or discharge temperature limit of the compressors). A relationship between the flow rate of the auxiliary compressed air injected at the rotary machine and the resulting power increase and/or fuel rate decrease of the rotary machine is a characteristic of the rotary machine and may vary with load and ambient conditions. The injection pressure is determined by a compressor discharge pressure of the rotary machine and the required additional pressure to overcome a pressure drop in piping of the combustor of the rotary machine and drive the injection flow into the combustor at the desired flow rate. Therefore, as one example, the controller may input the desired increase in output and/or reduction in the fuel rate of the rotary machine, or to minimize the overall cost per unit power output of the rotary machine, by inputting the compressor discharge pressure of the rotary machine, the load of the rotary machine, and the ambient conditions into one or more look-up tables, algorithms, or maps, which may output the desired flow rate and pressure of the auxiliary air. Further, the desired flow rate and pressure of the auxiliary compressed air may be bounded by the maximum allowable injection rate (of the rotary machine) and the maximum deliverable flow rate (of the turbocharger system). Further still, in some examples, the controller may additionally or alternatively optimize the desired flow rate and pressure of the auxiliary compressed air to minimize the overall cost per unit power output of the rotary machine.

At 404, method 400 includes adjusting the turbine backpressure valve to a position for achieving the desired flow rate of the auxiliary compressed air based on the operating conditions. In particular, the desired flow rate of the auxiliary compressed air is a desired discharge flow rate of the HPT compressor, and the corresponding turbine backpressure position may enable the HPT compressor to meet the desired discharge flow rate while avoiding HPT compressor choke conditions. As one example, the controller may input the operating conditions into one or more look-up tables, algorithms, or maps stored in a memory of the controller, which may output the corresponding turbine backpressure valve position for generating the desired flow rate of the auxiliary compressed air at the input operating conditions. As another example, the controller may reference one or more compressor maps stored in the memory of the controller, such as the example compressor maps shown in FIGS. 5 and 6, to adjust the turbine backpressure valve. For example, as the operating point of the compressor approaches a choke line on the map, the controller may adjust the turbine backpressure valve position to move the operating point away from the choke line. As a further example, the controller may make a logical determination (e.g., regarding a position of the turbine backpressure valve) based on logic rules that are a function of the operating conditions, including the ambient temperature, the load of the rotary machine, and the desired pressure of the auxiliary compressed air. The controller may then send a control signal to the turbine backpressure valve to actuate the turbine backpressure valve to the determined position.

As one example, adjusting the turbine backpressure valve to a relatively closed position decreases the mass flow through the HPT turbine, thereby decreasing the power into the HPT compressor and decreasing the mass flow through the HPT compressor. Additionally, adjusting the turbine backpressure valve to the relatively closed position increases the mass flow through the LPT turbines to help maintain a pressure ratio across the LPT stage. For example, a work load distribution may be shifted toward the LPT stage, as energy not consumed by the HPT turbine is directed to the LPT turbines, thereby increasing pressure from the LPT compressors. This in turn reduces a corrected mass flow of the HPT compressor, allowing for increased auxiliary compressed air flow before reaching a choke limit of the HPT compressor. Additionally, when a MPT turbine is included in parallel with the HPT turbine, such as in the example configuration of FIG. 2, the relatively closed position may also increase the mass flow through the MPT turbine, shifting the work load distribution to both the LPT stage and the MPT stage. By decreasing the mass flow through the HPT compressor, choke conditions due to a low discharge pressure and a high mass flow rate may be avoided, such as during lower rotary machine load operating conditions.

As another example, during higher ambient temperature conditions, an intake mass flow of the one or more LPT compressors is decreased due to a decrease in ambient air density, and adjusting the turbine backpressure valve to a relatively open position may increase a mass flow through the HPT compressor while decreasing a mass flow through the one or more LPT compressors to compensate for the decreased ambient air density (e.g., shift the work load distribution toward the HPT stage). Example compressor maps showing the effect of adjusting the turbine backpressure valve on the HPT compressor and the LPT compressors will be described below with respect to FIGS. 5 and 6.

At 406, method 400 includes determining if a change in operating conditions has occurred. For example, operating conditions may change due to a change in ambient conditions (e.g., an increase or decrease of the ambient temperature) and/or a change in the rotary machine operating conditions (e.g., an increase or decrease in the load), which may in turn shift the operating points of the turbocharger system compressors. In one example, the method at 406 may include determining if there has been a change in operating conditions that changes the desired position of the turbine backpressure valve. For example, the controller may automatically and continuously (e.g., in real-time as operating conditions change, as determined from received signals for various sensors of the system) determine the desired position of the turbine backpressure valve, as described above at 404. If the newly determined desired position is different than the current position of the turbine backpressure valve, the controller may determine a change in operating conditions that affects the turbine backpressure valve position has occurred.

If a change in operating conditions, as discussed above, has not occurred (e.g., the operating conditions have remained substantially constant), method 400 proceeds to 408 and includes maintaining the turbine backpressure valve position. For example, the turbine backpressure valve may be held at the position determined above at 404 to continue delivering the desired flow rate of auxiliary compressed air to the rotary machine for injection. Following 408, method 400 may return.

If the operating conditions have changed, method 400 proceeds to 410 and includes adjusting the turbine backpressure valve to maintain the desired flow rate of the auxiliary compressed air. As one example, the HPT compressor may shift toward choke conditions due to a decreased load of the rotary machine. In response, the turbine backpressure valve may be adjusted to a further closed position in order to avoid choke conditions while maintaining the desired flow rate. As another example, in response to an increased load of the rotary machine, the turbine backpressure valve may be adjusted to a further open position to enable the HPT turbine to operate at a higher speed, thereby increasing the pressure ratio across the HPT compressor. For example, the controller may input the updated operating conditions into the one or more look-up tables, algorithms, or maps stored in the memory of the controller, which may output the corresponding updated turbine backpressure valve position for generating the desired flow rate of the auxiliary compressed air. As another example, the controller may input the change(s) in the operating conditions into one or more look-up tables, algorithms, or maps, which may output a corresponding change in the turbine backpressure valve position. The controller may then send a control signal to the turbine backpressure valve to actuate the valve to the updated position. Following 410, method 400 may return.

In this way, by including the turbine backpressure valve downstream of the HPT turbine and actively adjusting the position of the valve via the control method of FIG. 4, the turbocharger system may be operated over a larger range of rotary machine loads and ambient conditions. Further, the turbine backpressure valve may be closed against relatively low pressures, allowing a lower cost valve to be used. By shifting the work load to the LPT stage (and in some examples, the MPT stage) by further closing the turbine bypass valve, increased injection flow may be provided to the rotary machine prior to reaching the choke limit of the HPT compressor. As an additional example, the turbine backpressure valve may be used to reduce an amount of input energy for starting the system. For example, the turbine backpressure valve may be relatively closed to idle the high pressure turbocharger to a low speed while the low pressure turbocharger loop starts. Because the high pressure turbocharger is parasitic to the low pressure turbocharger loop, idling the high pressure turbocharger will direct more energy to the LPT turbines and allow the low pressure turbocharger to reach a self-sustaining air Brayton cycle point with less input energy from an external source than if the high pressure turbocharger were able to freely operate during startup.

FIG. 5 shows an example compressor map 500 of a HPT compressor that is driven by a HPT turbine and included in a waste heat-driven air Brayton cycle turbocharger system, such as HPT compressor 152 shown in FIGS. 1-3. In particular, FIG. 5 illustrates the effect of adjusting a turbine backpressure valve coupled downstream of the HPT turbine (e.g., turbine backpressure valve 158 of FIGS. 1-3) on HPT compressor operation. The horizontal axis of the compressor map represents a corrected mass flow rate of the compressor, with values increasing from left to right, while the vertical axis represents a pressure ratio across the compressor (e.g., an outlet pressure divided by an inlet pressure), with values increasing from bottom to top. The compressor map includes a plurality of compressor speed lines 502, a surge limit 506, and a choke limit 504. The plurality of compressor speed lines denote compressor speeds that increase generally as the pressure ratio and/or mass flow increase. The surge limit represents where the compressor operation may lose stability and exhibit surge behavior, ranging from whoosh noise to violent oscillations of flow. The choke limit represents the highest possible mass flow rate at a given pressure ratio. An area between the surge limit and the choke limit represents a region of stable compressor operation.

A plurality of compressor operating points are represented by 508a-508f. For example, each operating point represents a HPT compressor pressure ratio and mass flow for a specific turbine backpressure valve position and set of operating conditions of a rotary machine receiving auxiliary compressed air from the HPT compressor. For example, operating point 508a may represent a 100% load operating condition of the rotary machine and operating point 508f may represent a 40% load operating condition of the rotary machine, with operating points 508*b*-508*e* representing rotary machine loads between 100% and 40% (e.g., 80% load at operating point 508*d* and 60% load at operating point 508*e*). The turbine backpressure valve may remain fully open until the operating point approaches the choke limit. For example, the turbine backpressure valve may be fully open at operating points 508*a*, 508*b*, 508*c*, and 508*d* and may be partially closed at operating points 508*e* and 508*f*. Additionally, the turbine backpressure valve may be further closed as rotary machine load decreases, such that the turbine backpressure valve is in a further closed position at 508*f* compared with 508*e*. Further closing the turbine backpressure valve as the rotary machine load decreases allows for reducing the pressure ratio of the HPT compressor so that the operating points follow the choke limit, as indicated by an arrow 510. If the turbine backpressure valve were not included and actively controlled, the low rotary machine load conditions would push the HPT compressor operating points to the right of the choke line, as indicated by an arrow 512.

FIG. 6 shows an example compressor map 600 of a LPT compressor that is driven by a LPT turbine and included in a waste heat-driven air Brayton cycle turbocharger system upstream of a HPT stage, such as LPT compressor 124 or 130 shown in FIGS. 1-3. In particular, FIG. 6 illustrates the effect of adjusting a turbine backpressure valve coupled downstream of a HPT turbine (e.g., turbine backpressure valve 158 of FIGS. 1-3) on LPT compressor operation. The horizontal axis of the compressor map represents a corrected mass flow rate of the compressor, with values increasing from left to right, while the vertical axis represents a pressure ratio across the compressor, with values increasing from bottom to top.

The compressor map includes a plurality of compressor speed lines 602, which denote compressor speeds that generally increase as the pressure ratio and/or mass flow increase, and a plurality of compressor operating points 608*a*-608*f*. For example, each operating point represents a LPT compressor pressure ratio and mass flow for a specific turbine backpressure valve position and set of operating conditions of a rotary machine receiving auxiliary compressed air from the turbocharger system. For example, operating point 608*a* may represent an ambient air temperature of 95° C. and operating point 608*f* may represent an ambient air temperature of 59° C., with operating points 608*b*-608*e* representing ambient air temperatures between 95° C. and 59° C. such that the ambient air temperature decreases from operating point 608*a* to operating point 608*f*. Additionally, the operating points 608*a*-608*f* of the LPT compressor may represent different loads of the rotary machine (and correspond to the operating points 508*a*-508*f* of the HPT compressor). For example, operating point 608*a* may represent a 100% load operating condition of the rotary machine and operating point 608*f* may represent a 40% load operating condition of the rotary machine, with operating points 608*b*-608*e* representing rotary machine loads between 100% and 40% (e.g., 80% load at operating point 608*d* and 60% load at operating point 608*e*). As described above with respect to FIG. 5, the turbine backpressure valve may be kept open during stable operation of the HPT compressor and further closed as the HPT compressor approaches choke, such that the turbine backpressure valve is fully open at operating points 608*a*-608*d* and partially closed at operating points 608*e* and 608*f*. Closing the turbine backpressure valve shifts the work balance to the LPT turbine, causing the LPT compressor operating points to shift in the direction of an arrow 610.

In this way, a waste heat-driven air Brayton cycle turbocharger system is provided for injecting boost air in a rotary machine across a wide range of ambient and rotary machine operating conditions. In some examples, the turbocharger system includes two stages, a high pressure stage and a low pressure stage. In other examples, the turbocharger system includes three stages such that a high pressure compression process is divided between two compression stages (e.g., the high pressure stage and a mid-pressure stage), thereby increasing an overall thermodynamic compression process by enabling a higher pressure boost air to be achieved for a same amount of input energy. As a result, a size of the system may be reduced, a flow rate of the boost air may be increased, and/or lower mechanical stress may be applied on the high pressure stage and the mid-pressure stage. Further, each system may include a valve coupled downstream of the high pressure stage turbine to actively regulate a backpressure at the high pressure stage turbine. As a result, a work load of the system may be shifted toward the low pressure stage (and in some examples, the mid-pressure stage) by further closing the valve, thus avoiding choke conditions at the high pressure stage compressor at lower loads of the rotary machine, for example.

The technical effect of including three turbocharger stages in an air Brayton cycle injection system, with intercooling between each compression stage, is that a size of the system may be decreased while an overall thermodynamic efficiency of the compression process is increased.

The technical effect of including an actively controlled turbine backpressure valve downstream of a high pressure turbocharger turbine in an air Brayton cycle injection system coupled to a rotary machine is that the injection system is operable over a wider range of ambient and rotary machine operating conditions.

An example system for use with a power generator having a rotary machine including a combustor and an exhaust passage flowing exhaust gases from the combustor comprises: a heat exchanger positioned in the exhaust passage; and a turbocharger system, comprising: at least one low pressure turbocharger including a low pressure turbine fluidly coupled to an outlet of the heat exchanger and a low pressure compressor fluidly coupled to an inlet of the heat exchanger; at least one mid-pressure turbocharger including a mid-pressure turbine fluidly coupled to the outlet of the heat exchanger and a mid-pressure compressor fluidly coupled to the low pressure compressor; and at least one high pressure turbocharger including a high pressure turbine arranged in series or parallel with the mid-pressure turbine and a high pressure compressor arranged in series with the mid-pressure compressor and fluidly coupled to the combustor of the rotary machine. In a first example of the system, the high pressure turbine is arranged in series with the mid-pressure turbine, the high pressure turbine receiving air flow directly from an outlet of the mid-pressure turbine. In a second example of the system, which optionally includes the first example, the high pressure turbine is arranged in parallel with the mid-pressure turbine, each of the high pressure turbine and mid-pressure turbine receiving heated, compressed air flow from the outlet of the heat exchanger. A third example of the system optionally includes one or both of the first and second examples and further comprises a turbine backpressure valve arranged in a gas flow path downstream of an outlet of the high pressure turbine. In a fourth example of the system, which optionally includes one or more or each of the first through third examples, the turbocharger system is configured to deliver auxiliary compressed air from the high pressure compressor to the combustor of the rotary machine, and further comprising a controller including instructions stored on memory, than when executed during operation of the turbocharger system, cause the controller to: adjust a position of the turbine backpressure valve based on pressure and flow conditions of the turbocharger system and a desired flow rate of the auxiliary compressed air. In a fifth example of the system, which optionally includes one or more or each of the first through fourth examples, the rotary machine includes a turbine section and a compressor section separate from turbocharger system, and each of the at least one low pressure turbocharger, the mid-pressure turbocharger, the high pressure turbocharger, and the rotary machine rotate independently of one another. In a sixth example of the system, which optionally includes one or more or each of the first through fifth examples, a first intercooler is positioned in a first gas flow path between an outlet of the low pressure compressor and an inlet of the mid-pressure compressor, and a second intercooler is positioned in a second gas flow path between an outlet of the mid-pressure compressor and an inlet of the high pressure compressor. In a seventh example of the system, which optionally includes one or more or each of the first through sixth examples, the heat exchanger is configured to transfer heat from the exhaust gases flowing in the exhaust passage of the rotary machine to compressed air flowing through the heat exchanger from the low pressure compressor.

An example method for a turbocharger system of a power generation system comprises: adjusting a position of a turbine backpressure valve of the turbocharger system adapted to supply auxiliary compressed air to a rotary machine based on operating conditions of the turbocharger system and the rotary machine, the turbocharger system further including at least one low pressure turbocharger, the at least one low pressure turbocharger supplying compressed air to a heat exchanger arranged in an exhaust passage of the rotary machine, and a high pressure turbocharger including a high pressure turbine, the turbine backpressure valve arranged downstream of the high pressure turbine, and each of the low pressure turbocharger and high pressure turbocharger receiving heated, compressed air from the heat exchanger to drive rotation of the low pressure turbocharger and the high pressure turbocharger, respectively. In a first example of the method, adjusting the position of the turbine backpressure valve includes decreasing an opening of the turbine backpressure valve in response to a load of the rotary machine decreasing. In a second example of the method, which optionally includes the first example, adjusting the position of the turbine backpressure valve includes increasing an opening of the turbine backpressure valve in response to a load of the rotary machine increasing. In a third example of the method, which optionally includes one or both of the first and second examples, adjusting the position of the turbine backpressure valve includes adjusting the position of the turbine backpressure valve based on pressure and flow conditions of the turbocharger system while supplying the auxiliary compressed air to the rotary machine from a high pressure compressor of the high pressure turbocharger, the high pressure turbine driving rotation of the high pressure compressor. A fourth example of the method optionally includes one or more or each of the first through third examples and further comprises combusting both compressed, ambient air from a compressor of the rotary machine and the auxiliary compressed air at a combustor of the rotary machine and supplying combusted exhaust gases to the heat exchanger, downstream of a turbine of the rotary machine. A fifth example of the method optionally includes one or more or each of the first through forth examples and further comprises heating the compressed air from a low pressure compressor of the low pressure turbocharger at the heat exchanger via the combusted exhaust gases flowing through the heat exchanger. A sixth example of the method optionally includes one or more or each of the first through fifth examples and further comprises supplying heated, compressed air from the heat exchanger to each of a low pressure turbine of the low pressure turbocharger and the high pressure turbine, and wherein adjusting the position of the turbine backpressure valve adjusts an amount of air flowing through each of the low pressure turbine and high pressure turbine. In a seven example of the method, which optionally includes one or more or each of the first through sixth examples, adjusting the position of the turbine backpressure valve includes adjusting the turbine backpressure valve into a plurality of positions between and including fully open and fully closed as the operating conditions of the turbocharger system change, and based on each of a work load distribution between the low pressure turbocharger and the high pressure turbocharger and a choke limit of the high pressure turbocharger.

An example system for power generation using a rotary machine including a turbine section, compressor section, and combustor comprises: a heat exchanger positioned in an exhaust passage of the rotary machine; a turbocharger system, comprising: a low pressure turbocharger stage including at least one low pressure turbocharger, an outlet of a compressor of the at least one low pressure turbocharger fluidly coupled to an inlet of the heat exchanger and an inlet to a turbine of the at least one low pressure turbocharger fluidly coupled to an outlet of the heat exchanger; a mid-pressure turbocharger including a mid-pressure turbine driving rotation of a mid-pressure compressor, the mid-pressure compressor fluidly coupled to the outlet of the compressor of the at least one low pressure turbocharger with a first intercooler positioned therebetween and the mid-pressure turbine fluidly coupled to the outlet of the heat exchanger; a high pressure turbocharger including a high pressure turbine driving rotation of a high pressure compressor, the high pressure compressor fluidly coupled to an outlet of the mid-pressure compressor with a second intercooler positioned therebetween and the high pressure turbine adapted to receive heated, compressed air from the heat exchanger; and a turbine backpressure valve positioned in a flow path downstream of the high pressure turbine; and a controller including instructions stored on memory, than when executed during operation of the turbocharger system, cause the controller to: adjust a position of the turbine backpressure valve based on pressure and flow conditions of the turbocharger system. In a first example of the system, adjusting the position of the turbine backpressure valve based on the pressure and flow conditions of the turbocharger system includes adjusting the position of the turbine backpressure valve to a further closed position as the high pressure compressor approaches choke conditions. In a second example of the system, which optionally includes the first example, the high pressure turbine is fluidly coupled to an outlet of the mid-pressure turbine, the high pressure turbine arranged in series with the mid-pressure turbine. In a third example of the system, which optionally includes one or both of the first and second examples, the high pressure turbine is fluidly coupled to the outlet of the heat exchanger, the high pressure turbine arranged in parallel with the mid-pressure turbine.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by a control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the controller, where the described actions are carried out by executing the instructions in a system including the various system hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for use with a power generator having a rotary machine including a combustor and an exhaust passage flowing exhaust gases from the combustor, comprising:
   a heat exchanger positioned in the exhaust passage; and
   a turbocharger system, comprising:
      at least one low pressure turbocharger including a low pressure turbine fluidly coupled to an outlet of the heat exchanger and a low pressure compressor fluidly coupled to an inlet of the heat exchanger;
      at least one mid-pressure turbocharger including a mid-pressure turbine fluidly coupled to the outlet of the heat exchanger and a mid-pressure compressor fluidly coupled to the low pressure compressor; and
      at least one high pressure turbocharger including a high pressure turbine arranged in series or parallel with the mid-pressure turbine and a high pressure compressor arranged in series with the mid-pressure compressor and fluidly coupled to the combustor of the rotary machine.

2. The system of claim 1, wherein the high pressure turbine is arranged in series with the mid-pressure turbine, the high pressure turbine receiving air flow directly from an outlet of the mid-pressure turbine.

3. The system of claim 1, wherein the high pressure turbine is arranged in parallel with the mid-pressure turbine, each of the high pressure turbine and the mid-pressure turbine receiving heated, compressed air flow from the outlet of the heat exchanger.

4. The system of claim 1, further comprising a turbine backpressure valve arranged in a gas flow path downstream of an outlet of the high pressure turbine.

5. The system of claim 4, wherein the turbocharger system is configured to deliver auxiliary compressed air from the high pressure compressor to the combustor of the rotary machine, and further comprising a controller including instructions stored on memory, than when executed during operation of the turbocharger system, cause the controller to:
   adjust a position of the turbine backpressure valve based on pressure and flow conditions of the turbocharger system and a desired flow rate of the auxiliary compressed air.

6. The system of claim 1, wherein the rotary machine includes a turbine section and a compressor section separate from the turbocharger system, and each of the at least one low pressure turbocharger, the mid-pressure turbocharger, the high pressure turbocharger, and the rotary machine rotate independently of one another.

7. The system of claim 1, wherein a first intercooler is positioned in a first gas flow path between an outlet of the low pressure compressor and an inlet of the mid-pressure compressor, and a second intercooler is positioned in a second gas flow path between an outlet of the mid-pressure compressor and an inlet of the high pressure compressor.

8. The system of claim 1, wherein the heat exchanger is configured to transfer heat from the exhaust gases flowing in the exhaust passage of the rotary machine to compressed air flowing through the heat exchanger from the low pressure compressor.

9. A method for a turbocharger system of a power generation system, comprising:
   at a controller receiving input data from a sensor, adjusting a position of a turbine backpressure valve comprising an actuator and included in the turbocharger system adapted to supply auxiliary compressed air to a rotary machine based on operating conditions of the turbocharger system and the rotary machine, the turbocharger system further including at least one low pressure turbocharger, the at least one low pressure turbocharger supplying compressed air to a heat exchanger arranged in an exhaust passage of the rotary machine, and a high pressure turbocharger including a high pressure turbine, the turbine backpressure valve arranged downstream of the high pressure turbine, and each of the at least one low pressure turbocharger and the high pressure turbocharger receiving heated, compressed air from the heat exchanger to drive rotation of the at least one low pressure turbocharger and the high pressure turbocharger, respectively.

10. The method of claim 9, wherein adjusting the position of the turbine backpressure valve includes decreasing an opening of the turbine backpressure valve in response to a load of the rotary machine decreasing.

11. The method of claim 9, wherein adjusting the position of the turbine backpressure valve includes increasing an opening of the turbine backpressure valve in response to a load of the rotary machine increasing.

12. The method of claim 9, wherein adjusting the position of the turbine backpressure valve includes adjusting the position of the turbine backpressure valve based on pressure and flow conditions of the turbocharger system while supplying the auxiliary compressed air to the rotary machine from a high pressure compressor of the high pressure turbocharger, the high pressure turbine driving rotation of the high pressure compressor.

13. The method of claim 12, further comprising combusting both compressed, ambient air from a compressor of the rotary machine and the auxiliary compressed air at a combustor of the rotary machine and supplying combusted exhaust gases to the heat exchanger, downstream of a turbine of the rotary machine.

14. The method of claim 13, further comprising heating the compressed air from a low pressure compressor of the low pressure turbocharger at the heat exchanger via the combusted exhaust gases flowing through the heat exchanger.

15. The method of claim 9, further comprising supplying heated, compressed air from the heat exchanger to each of a low pressure turbine of the low pressure turbocharger and the high pressure turbine, and wherein adjusting the position of the turbine backpressure valve adjusts an amount of air flowing through each of the low pressure turbine and the high pressure turbine.

16. The method of claim 9, wherein adjusting the position of the turbine backpressure valve includes adjusting the turbine backpressure valve into a plurality of positions between and including fully open and fully closed as the operating conditions of the turbocharger system change, and based on each of a work load distribution between the low pressure turbocharger and the high pressure turbocharger and a choke limit of the high pressure turbocharger.

17. A system for power generation using a rotary machine including a turbine section, compressor section, and combustor, comprising:
   a heat exchanger positioned in an exhaust passage of the rotary machine;
   a turbocharger system, comprising:
      a low pressure turbocharger stage including at least one low pressure turbocharger, an outlet of a compressor of the at least one low pressure turbocharger fluidly coupled to an inlet of the heat exchanger and an inlet to a turbine of the at least one low pressure turbocharger fluidly coupled to an outlet of the heat exchanger;
      a mid-pressure turbocharger including a mid-pressure turbine driving rotation of a mid-pressure compressor, the mid-pressure compressor fluidly coupled to the outlet of the compressor of the at least one low pressure turbocharger with a first intercooler positioned therebetween and the mid-pressure turbine fluidly coupled to the outlet of the heat exchanger;
      a high pressure turbocharger including a high pressure turbine driving rotation of a high pressure compressor, the high pressure compressor fluidly coupled to an outlet of the mid-pressure compressor with a second intercooler positioned therebetween and the high pressure turbine adapted to receive heated, compressed air from the heat exchanger; and
      a turbine backpressure valve positioned in a flow path downstream of the high pressure turbine; and
         a controller including instructions stored on memory, than when executed during operation of the turbocharger system, cause the controller to:
      adjust a position of the turbine backpressure valve based on pressure and flow conditions of the turbocharger system.

18. The system of claim 17, wherein adjusting the position of the turbine backpressure valve based on the pressure and flow conditions of the turbocharger system includes adjusting the position of the turbine backpressure valve to a further closed position as the high pressure compressor approaches choke conditions.

19. The system of claim 17, wherein the high pressure turbine is fluidly coupled to an outlet of the mid-pressure turbine, the high pressure turbine arranged in series with the mid-pressure turbine.

20. The system of claim 17, wherein the high pressure turbine is fluidly coupled to the outlet of the heat exchanger, the high pressure turbine arranged in parallel with the mid-pressure turbine.

* * * * *